United States Patent Office 3,222,365
Patented Dec. 7, 1965

3,222,365
4-HALOPHENYL-2-ALKYL-1(2)-PHTHALAZINONES
Hugh R. Sullivan, Jr., Indianapolis, Ind., assignor to Eli
Lilly and Company, Indianapolis, Ind., a corporation
of Indiana
No Drawing. Filed Jan. 15, 1962, Ser. No. 166,425
3 Claims. (Cl. 260—250)

This invention relates to new compositions of matter having anticonvulsant activity and to methods of treating convulsive seizures and the like by the administration of these compositions. More particularly, this invention relates to novel anticonvulsant phthalazinones.

For the immediate control of convulsions, a general anesthesia with chloroform or ether is usually preferred. However, three closely related classes of drugs have generally been indicated for the prevention of convulsions, and for immediate control thereof, when a general anesthesia is contraindicated or not available. The following formulae, wherein R is a hydrocarbon radical and R' is hydrogen or a hydrocarbon radical, are representative of these prior-art anticonvulsant drugs:

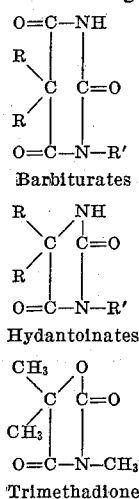

Barbiturates

Hydantoinates

Trimethadione

Although the above drugs have excellent anticonvulsant activity, they also are central nervous system depressants and will eventually habituate the patients. Since control of certain types of convulsive seizures requires administration of the anticonvulsant substance over long periods of time, habituation may become a serious problem. Furthermore, depression of the central nervous system may accentuate convulsive attacks, particularly in those cases where the brain waves are already abnormally slow, such as in petit mal and psychomotor attacks.

Thus, there is a pressing need for a drug which will not produce the undesirable side effects of known anticonvulsants, but which will have comparable anticonvulsant activity. The primary object of this invention is to provide such a drug, as well as methods for utilizing this drug in the treatment of convulsive and related seizures.

These and other objects of this invention are accomplished by providing a new composition of matter which comprises a 4-phenyl-2-alkyl-1(2)-phthalazinone, wherein the phenyl moiety is mono- or poly-halogen substituted, or, in other words, has at least one halo substituent. The compounds of this invention are more fully represented by the following general formula:

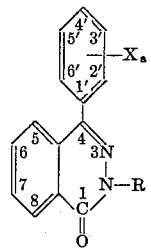

Wherein R is a lower alkyl-radical (i.e., contains 1 to 4 carbon atoms); X is halo, i.e., fluoro, chloro, bromo, iodo—preferably, chloro; and $a$ is an integer having a value of 1 to 5 and, preferably, 1 or 2. It is also preferred that the halo substituent, or substituents, X, be located at the 4' or the 3',4' positions, since the resulting compounds are easily synthesized and have good anticonvulsant activity. The 3',4'-disubstituted derivative is most preferred.

The phthalazinone anticonvulsants of this invention are a new type of anticonvulsant, differing from prior-art anticonvulsants, such as those described hereinbefore, in at least two important respects. In the first place, the chemical structure of the phthalazinone anticonvulsants of this invention is drastically different from the structures of the closely related barbiturates, hydantoinates, and oxazolidines (e.g., trimethadione). In the second place, the anticonvulsants of this invention produce a completely different central nervous system response, in that these compounds do not have the central nervous system depressant activity of prior-art anticonvulsants.

Representative of the novel phthalazinones of this invention are 4 - (3',4' - dichlorophenyl) - 2 - methyl-1(2) - phthalazinone, 4 - (4' - chlorophenyl) - 2 - methyl-1(2) - phthalazinone, 4 - (2',5' - dichlorophenyl)-2-methyl - 1(2) - phthalazinone, 4 - (4' - bromophenyl)-2 - ethyl - 1(2) - phthalazinone, 4 - (4' - iodophenyl)-2-butyl - 1(2) - phthalazinone, 4 - (4' - chlorophenyl)-2 - propyl - 1(2) - phthalazinone, 4 - (4' - chlorophenyl)-2 - propyl - 1(2) - phthalazinone, 4 - (4' - fluorophenyl)-2 - methyl - 1(2) - phthalazinone, and the like. A highly preferred embodiment of this invention is 4 - (3',4' - dichlorophenyl) - 2 - methyl - 1(2) - phthalazinone. This compound has a high order of anticonvulsant activity.

Another embodiment of this invention is a method for controlling convulsions and equivalent seizures which comprises administering to a patient a therapeutically adequate amount of a 4 - (halophenyl) - 2 - alkyl - 1(2)-phthalazinone of this invention. Oral administration is most convenient and, for this purpose, the phthalazinone is provided in suitable oral dosage form, such as tablets, filled capsules, and the like. The phthalazinones of this invention are stable and are quite compatible with the commonly used excipients employed in the preparation of tablets and capsules. In addition to oral administration, the anticonvulsant compounds of this invention can also be administered parenterally in the form of aqueous suspensions or aqueous propylene glycol solutions.

For the treatment of adults in accordance with this invention, the anticonvulsant is administered in therapeutically adequate amounts (i.e., in an amount adequate to control convulsive seizures—generally ranging from daily doses to about 1 mg. to about 250 mg., or somewhat more, and, preferably, from about 10 mg. to about 100 mg. However, the optimum dosage naturally varies with individual patients and, accordingly, must be determined for each by trial and error. The smaller daily dose amounts can be given in a single dose, but the larger amounts are preferably given in several divided doses, most conveniently at meal times.

A pharmaceutical composition (that is, a pharmaceutical preparation in the form of a tablet, capsule, suspension, or the like), wherein the improvement comprises a therapeutically adequate amount of a phthalazinone, as described herein, forms another embodiment of this invention. This embodiment encompasses (1) a solid pharmaceutical dosage form for oral administration, containing a therapeutically adequate amount of the phthalazinones of this invention and a pharmaceutical excipient, and (2) an aqueous pharmaceutical dosage form for parenteral administration, containing a therapeutically adequate amount of said phthalazinone and a pharmaceutical excipient. Furthermore, these dosage forms can contain other anticonvulsants, such as those discussed hereinabove and more fully described in De Re Medica (Indianapolis, Eli Lilly and Company, 1951), for example, on pages 413–416.

The following examples are representative of the preparation of the novel phthalazinones of this invention.

EXAMPLE I

*Preparation of 4-(4'-chlorophenyl)-2-methyl-1(2)-phthalazinone*

A reaction mixture, containing 15.0 g. of o-(4-chlorobenzoyl)benzoic acid, 5.6 g. of methylhydrazine and 50 ml. of benzene, was heated at reflux temperature for two hours with stirring. Thereafter, the reaction mixture was cooled, evaporated to dryness, in vacuo, and the residual solid was dissolved in 200 ml. of chloroform. This solution was washed with two 100 ml. portions of water and the wash liquid was discarded. The chloroform was removed from the washed organic solution in vacuo to yield solid 4 - (4' - chlorophenyl) - 2 - methyl-1(2)-phthalazinone which, after three recrystallizations from a chloroform-petroleum ether (Skellysolve F) solution, melted at 147–148° C., and weighed 9.0 g. *Analysis.*— Calculated for $C_{15}H_{11}N_2OCl$: C, 66.45; H, 4.08; N, 10.34; Cl, 13.10. Found: C, 66.34; H, 4.11; N, 10.61; Cl, 13.39.

EXAMPLE II

*Preparation of 4-(3',4'-dichlorophenyl)-2-methyl-1(2)-phthalazinone*

A reaction mixture containing 29.5 g. of o-(3,4-dichlorobenzoyl)benzoic acid, 9.2 g. methylhydrazine, and 100 ml. of benzene was heated at reflux temperature for three hours with stirring and then cooled. Solvent was removed from the reaction mixture in vacuo, leaving a residual solid, which was then dissolved in 200 ml. of chloroform. This solution was washed with two 100 ml. portions of water. The wash liquid was discarded and chloroform was removed in vacuo from the washed organic solution. Three recrystallizations of the residue from ethyl acetate yielded 23.5 g. of 4-(3',4'-dichlorophenyl)-2-methyl - 1(2) - phthalazinone which melted at 171–172° C. *Analysis.*—Calculated for $C_{15}H_{10}N_2OCl_2$: C, 59.03; H, 3.30; N, 9.18; Cl, 23.24. Found: C, 59.11; H, 3.24; N, 9.04; Cl, 23.57.

Other phthalazinones of this invention are produced in a similar fashion. For example, 4 - (2',5' - dichlorophenyl)-2-methyl-1(2)-phthalazinone is produced by employing the process of Example I, with the exception that o - (2,5 - dichlorobenzoyl)benzoic acid is employed in place of o-(4-chlorobenzoyl)benzoic acid. The following compounds of this invention are similarly prepared by the condensation of a lower-alkylhydrazine with the appropriate o-(halobenzoyl)-benzoic acid: 4 - (3',4' - difluorophenyl) - 2 - ethyl - 1(2) - phthalazinone, 4 - (2',3' - dichlorophenyl) - 2 - t - butyl-1(2)-phthalazinone, 4 - (4' - chlorophenyl) - 2 - sec - butyl-1(2) - phthalazinone, 4 - (2',5' - diiodophenyl)-2-isopropyl - 1(2) - phthalazinone, 4 - (2',5'-dibromophenyl)-2-methyl-1(2)-phthalazinone, and the like.

It is preferred that the 4 - (halophenyl) - 2 - methyl-1(2) - phthalazinones of this invention contain no additional substituents, since these compounds are extremely effective and cheap anticonvulsant drugs. However, substitution with halo or amino groups at positions 5, 6, 7, or 8 of the phthalazinone moiety is not undesirable. In such cases, monosubstitution is preferred. Exemplary of such substituted phthalazinones are 4-(4'-chlorophenyl) - 5 - chloro - 2 - methyl - 1(2) - phthalazinone, 4 - (3',4' - dichlorophenyl) - 7 - amino - 2 - methyl-1(2) - phthalazinone, 4 - (4' - chlorophenyl) - 6-iodo-2 - methyl - 1(2) - phthalazinone, 4 - (2',5' - dichlorophenyl) - 8 - amino - 2 - propyl - 1(2) - phthalazinone, and the like.

I claim:
1. 4 - (3',4' - dichlorophenyl) - 2 - methyl - 1(2)-phthalazinone.
2. 4-(4'-chlorophenyl)-2-methyl-1(2)-phthalazinone.
3. A 4 - halophenyl - 2 - alkyl - 1(2) - phthalazinone of the formula

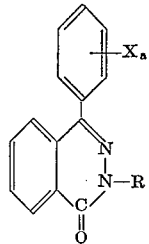

wherein R is a lower alkyl radical containing from 1 to 4 carbon atoms, X is halogen selected from the group consisting of fluorine, chlorine, bromine and iodine, and $a$ is an integer from 1 to 5 indicating the number of said halogen atoms substituted on the phenyl ring.

References Cited by the Examiner
UNITED STATES PATENTS

| | | | |
|---|---|---|---|
| 2,780,577 | 2/1957 | Phillips et al. | 167—65 |
| 3,004,027 | 10/1961 | Gordon et al. | 260—250 |
| 3,012,033 | 12/1961 | Engelbrecht et al. | 260—250 |
| 3,013,943 | 12/1961 | Berger | 167—65 |

OTHER REFERENCES

Mustafa et al.: J. Amer. Chem. Soc., vol. 82 (1960), pages 2735–9.

NICHOLAS S. RIZZO, *Primary Examiner.*

IRVING MARCUS, WALTER A. MODANCE,
*Examiners.*